Nov. 22, 1960  W. F. v JASKOWSKY ET AL  2,961,540
EGG CANDLING DEVICE
Filed Feb. 18, 1957  2 Sheets-Sheet 2

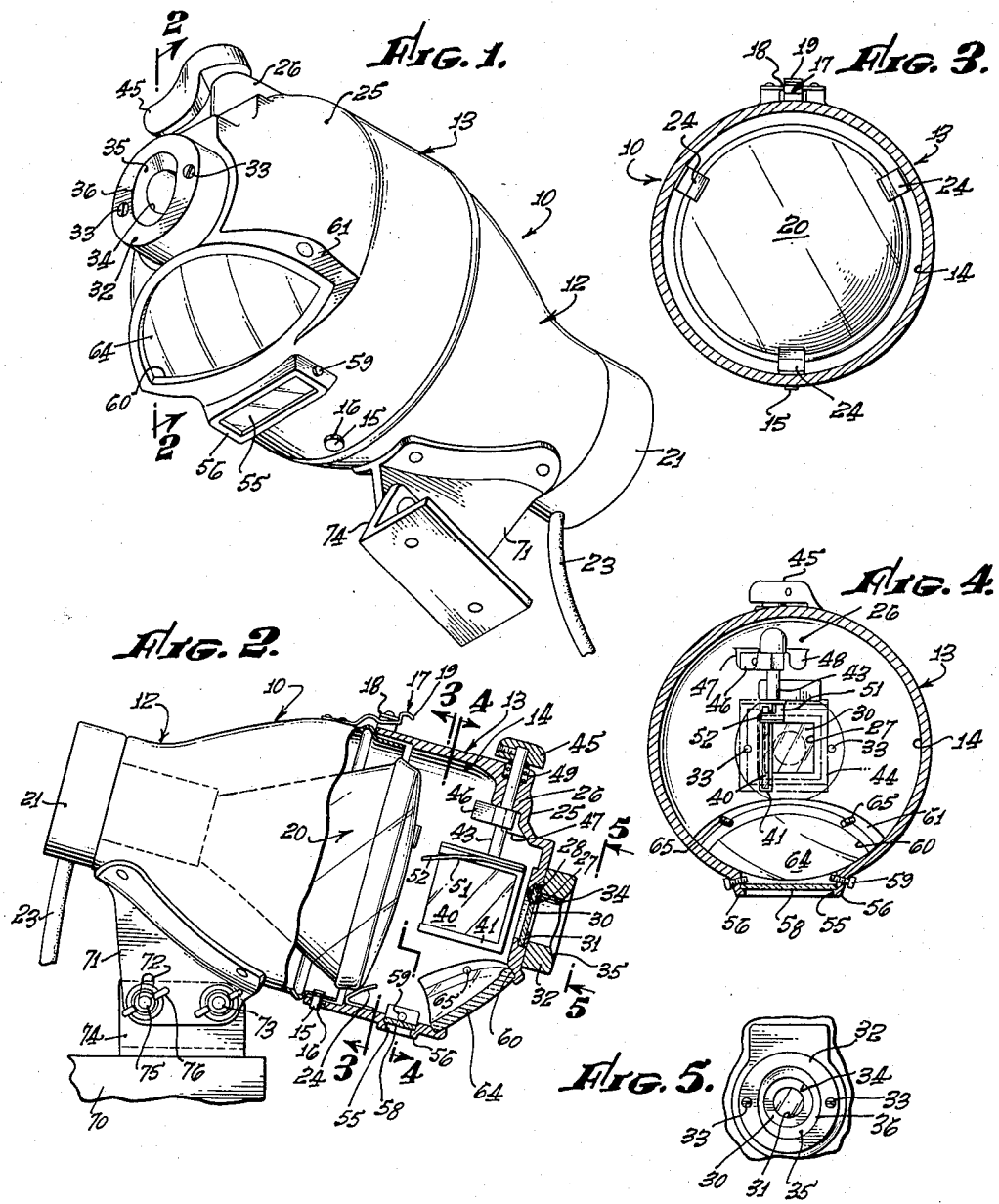

INVENTORS.
WOLDEMAR F. v JASKOWSKY,
IRVIN R. PFISTER,

BY THEIR ATTORNEYS
HARRIS, KIECH, FOSTER & HARRIS.

United States Patent Office 2,961,540
Patented Nov. 22, 1960

2,961,540

EGG CANDLING DEVICE

Woldemar F. v Jaskowsky, Pasadena, and Irvin R. Pfister, Los Angeles, Calif., assignors to Ultra-Violet Products, Inc., San Gabriel, Calif.

Filed Feb. 18, 1957, Ser. No. 640,929

7 Claims. (Cl. 250—71)

Our invention relates to egg candling methods and apparatus and more particularly to egg candling in which the rays passing through the egg are carefully filtered or controlled to show various internal defects of an egg in one operation.

Early egg candling devices inspected eggs internally by placing them in a strong beam of visible light designed to make visible, by illumination or shadow, certain internal defects such as advanced sourness, blood masses, shell defects, etc., thus making possible the grading of eggs into commercially established grades. The pseudomonas bacteria is known to create souring when it advances through the shell from an exterior position to a position between the outer and inner shell membranes. Such pseudomonas bacteria are not detectible by exclusive use of such visible light, except in advanced states of spoilage.

More recent egg candling devices employ radiation in the ultra-violet range to cause a dye produced by the pseudomonas bacteria to fluoresce, making possible the detection of sour or potentially sour eggs. To combine egg grading and pseudomonas detection, it has been proposed in these devices to transfer the egg to independent ultra-violet and visible beams, an operation that is both time consuming and hard on the eyes of the grader who must visually concentrate on the egg when held in beams of quite different visual intensity.

A later design, shown in the patents to M. J. Vogel Nos. 2,686,267 and 2,733,351, proposes to filter some of the visible radiation from the center of a beam produced by an ultra-violet source, but to by-pass enough visible light around the filter to permit candling. Such a system is open to certain disadvantages and is costly in requiring a filter of a diameter substantially the same as the window or lens of the source. To permit candling of eggs of various shell color, such devices have provided shutter means controlling the amount of visible light passing around the periphery of the filter and joining with the filtered radiation.

Concerning these latter devices, the filter used therein has been one made of Corning No. 5876 glass of a transmission characteristic to be later described. The visible light passing through it and the by-passed radiation from the source have heretofore produced a resultant beam having a substantial amount of green radiation therein which we have found to interfere with accurate results when searching for pseudomonas in their early stages of development, particularly as such bacteria produce a pigment evidencing a strong greenish fluorescence when excited by ultra-violet radiation. We have found that much more accurate detections of pseudomonas can be achieved in the absence of any green color in the radiation employed. In accordance with the present invention, this is made possible by employing a modified filter and eliminating the large amounts of green light heretofore present. It is an object of the present invention to candle eggs in a beam of radiation containing ultraviolet wavelengths but very little or substantially none of the green wavelengths.

A further object is to candle eggs in a beam of radiation comprising ultra-violet radiation and substantial amounts of blue radiation. In this connection, it is an object to use an ultra-violet source which produces some blue radiation and to employ therewith a filter that will transmit a maximum amount of the blue radiation or at least an amount thereof substantially in excess of filters that have heretofore been used.

A further object is to provide a candling aperture of novel configuration before which the egg can be positioned during simultaneous candling for defects that show up in visible and ultra-violet radiation. Another object is to concentrate the beam toward such aperture and to filter the entire beam in a position close to the aperture, thus avoiding a beam that is a composite of filtered and unfiltered radiation from the source.

Still a further object is to produce a concentrated beam of unique properties which exposes the egg to radiation exciting to a greenish fluorescence a pigment formed by pseudomonas bacteria but which excludes all green radiation, the beam including other visible radiation sufficient to illuminate the interior of the egg, such a beam accentuating the ease and accuracy of egg candling operations.

Still another object is to provide an easily changeable radiation intensity in such beam while maintaining substantially constant the relative intensities of the component wavelengths thereof. In this connection, it is an object to provide a structure which, in effect, varies the thickness of the filter to provide for candling eggs of different shell color and thickness. It is also an object of the invention to use a main filter of lesser density than are conventional filters used in the aforesaid egg candling devices of the prior art. By using filters of the same average density as in the prior art, the visible blue light needed for detection of the more conventional egg defects is usually insufficient when the ultra-violet radiation is optimum for the detection of the pseudomonas.

However, we have found that by employing a filter which will absorb substantially all of the green light and transmit the ultra-violet and blue light it was possible to secure normal grading of all defects. In fact it has been found that with the correct filter thickness the blue light which enters through the shell of the egg gives a very fine white appearance to the albumen as the shell absorbs sufficient colors to leave nearly a clear white reflection to the inside of the egg. This is a marked improvement over any previous candling lamp.

A further object is to provide an egg candling device of improved shape and utility, preferably with a multiple-aperture housing providing auxiliary radiation beams into which the egg can be moved either for preliminary appraisal guiding the ultimate candling or for more critical or selective checking of certain characteristics of the egg.

Further objects and advantages will be apparent to those skilled in the art from a consideration of the embodiment of the invention described hereinafter and illustrated in the drawings, in which:

Fig. 1 is a perspective view of the invention as viewed from a lower front position;

Fig. 2 is a longitudinal sectional view of the invention taken as suggested by the line 2—2 of Fig. 1;

Figs. 3, 4 and 5 are transverse sectional and elevational views taken as indicated by corresponding lines of Fig. 2;

Figure 6:
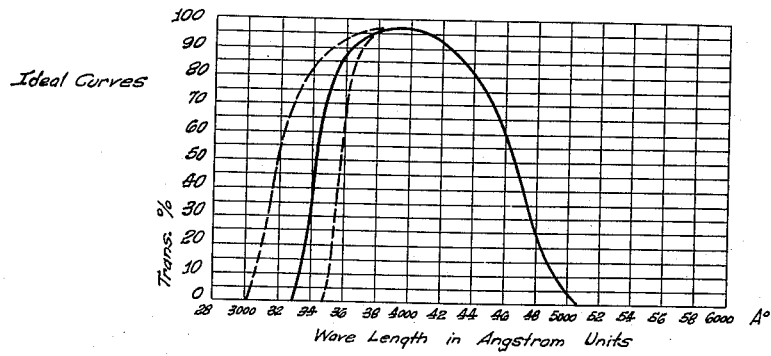
Figs. 6, 7 and 8 are transmission curves illustrating respectively an ideal range of curves in accordance with the invention, the preferred filter especially formulated for this invention and the filter previously proposed for ultraviolet egg candling.

The invention is preferably formed of a tubular housing 10 formed of a rear section 12 and a front section 13 detachably connected together to form a lamp chamber 14. The detachable connection includes, at a lower position, a pin 15 carried by the rear section 12 and extending into an opening 16 of the front section and, at an upper position, a latch 17 extending within an arched keeper 18 to latch thereto until a finger-engaging portion 19 thereof is depressed to unlatch and assume a position in which it is withdrawable through the arched keeper 18. In a reverse or assembly operation, the pin 15 is positioned in the opening 16 and the sections 12 and 13 are latched by being moved together with the portion 19 of the latch positioned within the keeper 18. Other latching or holding means may be employed.

A reflector-type ultra-violet lamp 20 has its base threaded into a socket 21 closing the rear of the housing 12, this lamp being energized through paired conductors in a flexible cable 23 leading to an energizing source suitable for energizing the lamp 20. Conventionally, this lamp is a mercury vapor discharge lamp, preferably with a built-in reflector of the "spot" type. Lamps known as CH4 spot or H–100–SP4 are typical 100 watt sources well suited to the invention, these being energized from a conventional transformer to which the cable 23 is connected.

Figure 9:
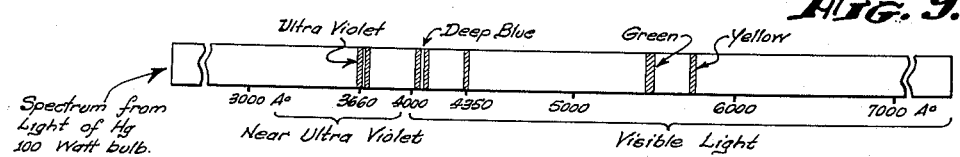
Fig. 9 shows the approximate spectrum of the ultraviolet light source to the same abscissae scale.

The spectrum from such a lamp is suggested in Fig. 9 which shows some of the more important lines. For example, there exist strong ultra-violet lines at about 3660 A., two strong blue lines slightly above 4000 A., a strong light blue line at about 4350 A., a strong green line at about 5460 A. and yellow lines at about 5780 A., to mention the most significant component radiations. In the blue and near ultra-violet range below and about 4000 A., the spectrum is very intense in the corresponding radiations, which are here employed to fluoresce the pigment produced by the pseudomonas bacteria in incipient or active stages, making such infected eggs appear with a distinct greenish color readily recognizable by an operator with a minimum of training in the egg candling field.

The front or lens of the lamp 20 is of smaller diameter than the housing sections 12 and 13 and is disposed near the telescopic junction of these sections. The front section 13 carries three spring clips 24 which bear against the lens periphery to center and rigidify the lens when the sections 12 and 13 are latched together, also to bias the sections away from each other against the action of the latch 17, the clips 24 thus rigidifying and stabilizing the housing.

Forward of the lamp 20, the housing section 13 provides a forwardly tapering portion 25 having a thickened protrusion 26 for journaling the filter-adjusting means to be described. The portion 25 converges to an opening 27 which is counterbored to form a filter-receiving space 28. A relatively thin and small main filter 30 is held in place by an aperture plate 31 having an aperture which is preferably of smaller diameter than the opening 27. The aperture plate 31 is in turn held in position by a thick-walled candling collar 32 attached by screws 33.

The candling collar 32 provides an egg-candling aperture 34 of substantially smaller cross-sectional size than the egg to be candled. The aperture plate 31 further restricts the radiation traversing the egg-candling aperture 34 to the central portion of the latter. All of the radiation transmitted through the egg-candling aperture 34 must traverse the filter 30. An egg-receiving or tapered surface 35 flares from the substantially circular opening 34 to an elliptical or egg-shaped edge 36 at the front of the collar 32. The surface 35 may be substantially a segment of an ellipsoid but preferably is contoured to be more nearly of egg shape to receive the egg, blunt end up, as its smaller end is held in the fingers of the operator. If desired, the collar 32 may be formed of soft material to minimize breakage should the operator be distracted while moving an egg into an adjacent or contacting position. The shape of the surface 35 aids materially in blocking peripheral light around the shell and in performing the candling operation with maximum accuracy.

An ideal filter 30 according to the invention would absorb all the green and yellow radiation but would pass a maximum of blue and the near ultra-violet. Such an ideal filter would have a lower cut-off point at or below about 3000–3500 A. and an upper cut-off point below about 5100 A. The former is not nearly as critical as the latter, which upper cut-off is selected to minimize the green radiation, particularly the intense green line of the ultra-violet source at about 5460 A. A desirable characteristic curve is shown in full lines in Fig. 6 with dotted alternatives in the lower range that will produce results varying little from the ideal.

From the standpoint of the present invention, the most significant portion of the filter characteristic is in the region of about 3300–4800 A. It is desirable that the filter transmit large amounts of blue and near ultra-violet radiation in such region between about 3300 A. and 4800 A.

Figure 7:
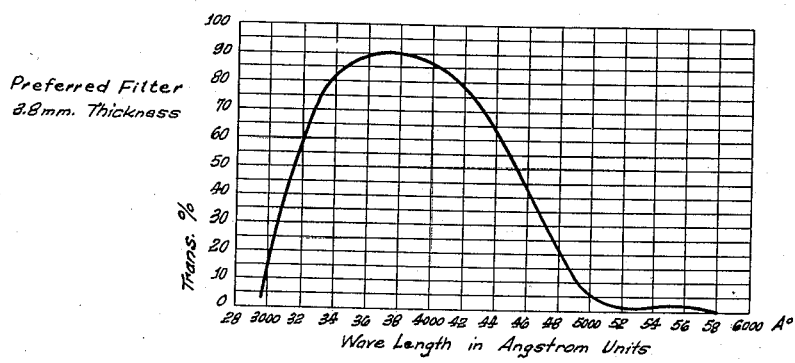

A filter glass that has been found to be very successful in the commercial practice of the invention has a transmission characteristic shown in Fig. 7, representing a transmission curve of a glass filter of a thickness of 3.8 mm. Such a glass has a broad peak transmission in the region of about 3300–4400 A. It transmits substantially none of the green radiation and is effective in transmitting ultra-violet radiation down to about 3000 A.

Figure 8:
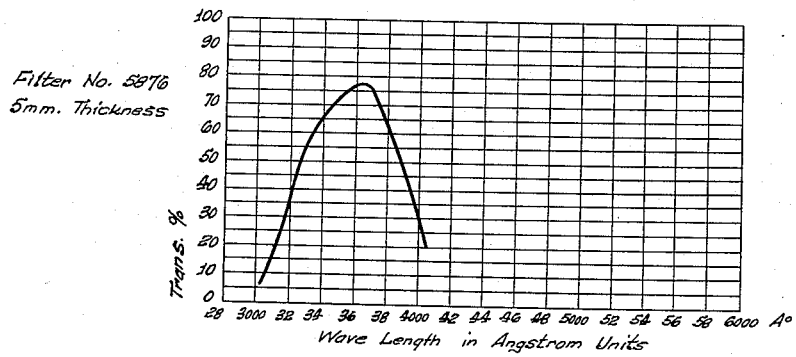

As compared with the best filter heretofore employed, No. 5876 shown in Fig. 8, it will be apparent that the filter of the invention passes almost all the blue that the older filter absorbs substantially completely. Additionally, the new filter provides a whiter appearance of the albumen inside the egg than the No. 5876 filter because the latter passes much yellow and green radiation and gives a greenish-yellowish color to the albumen which interferes with the easy identification of defects within the egg.

Additionally, however, it must be remembered that the total radiation reaching the egg in the prior art candling devices employing the No. 5876 filter was not composed exclusively of radiation transmitted in accordance with the curve of Fig. 8. This is because of the light by-passing the filter and heretofore thought necessary. This by-passed light contained the strong green line of Fig. 9 which the present invention specifically suppresses.

The curves of Figs. 7 and 8 are transmission curves based on respective filters of commensurate but slightly different thickness, namely about 5 mm. for the prior filter No. 5876 of Fig. 8 and about 3.8 mm. for the herein-preferred filter of Fig. 7. The latter thickness, while usually giving optimum results in detecting pseudomonas bacteria will usually not be ideal for the detection of defects for which eggs are normally graded, particularly when testing dark-shell eggs. Extensive tests have shown that best results are obtained with the present invention by employing a main filter 30 of lesser thickness than employed in prior devices, e.g., 2.5 mm. or about 2.5–3 mm. to give a normal grading that is entirely adequate and, in fact, superior to conventional egg inspection equipment. In testing eggs of lighter shell color, it is often desirable to have a filter of variable thickness. The invention provides a means for effectively varying the filter thickness to change the total radiation intensity of such beam.

Such a beam-varying means is best shown in Figs. 2 and 4 as comprising a supplemental filter 40, usually of the same filter material as the filter 30, mounted in a three-sided frame 41 with the unframed edge movable into the beam focused toward the aperture 34 by the reflector of the lamp 20. To accomplish this, the frame 41 is mounted on the lower end of a shaft 43 journaled in an upright opening of the protrusion 26 to turn about an axis disposed to one side of the aperture of the aperture plate 31, the frame swinging the supplemental filter 40 from the full-line or retracted position shown in full-lines in Figs. 2 and 4 to the dotted line or in-beam position shown by dotted lines 44 in Fig. 4. A finger lever 45 is secured to the shaft 43 at the top of the housing 10 and moves the supplemental filter 40 between such retracted and in-beam positions or between such end positions and any intermediate position in which the exposed edge of the supplemental filter 40 traverses an intermediate portion of the lamp beam. The end or maximum positions of the frame 41 and its filter 40 are determined by a stop member 46 adjustably secured to the shaft 43 and engaging stop members 47 and 48 disposed on opposite sides of the shaft axis. A coiled spring 49 (Fig. 2) surrounds the shaft 43 in a counterbore of the thickened portion 26. Being compressed between the bottom wall of this counterbore and the lever 45, this spring resiliently holds the frame and its filter in any selected position.

Excellent results will be obtained by forming the main filter 30 and the supplemental filter 40 of small square sections of the glass of Fig. 7, respectively of 2.5 mm. and 3 mm. thickness. The small squares can be cut from larger glasses and are both economical and easy to replace. In this latter connection, the supplemental filter 40 can be slid into side grooves of the frame 41, being held in place by a spring finger 51 carrying a latch 52 which is normally disposed against or adjacent the exposed edge of the filter 40.

The aperture 34 faces forwardly of the housing 10 and most candling operations can be performed merely by holding the egg adjacent the tapered surface 35. In addition, however, it is often desirable to employ supplemental beams for checking specific characteristics of the eggs. In this connection, the front section 13 provides a second or downwardly-facing aperture or opening 55 formed between depending lips 56 of the housing. The downwardly-directed opening 55 transmits a beam representing either the unmodified radiation from the lamp 20, as by use of a clear or frosted glass 58 held in place by screws 59 which block its inward movement, or radiation from the lamp 20 modified to simulate daylight. The latter is distinctly preferable and can be effected using a glass 58 having a slight blue color.

In addition, the invention preferably provides a third or angled aperture or opening 60 within a depending frame 61 (Fig. 1), being of a shape best shown in Figs. 1, 2 and 4 and being closed by a relatively thick filter 64 he'd in place by screws 65. This filter is preferably of Corning No. 5876 glass of about 6 mm. thickness and having the transmission characteristics shown in Fig. 7. This filter is of a deep purplish color, as compared with the filters 30 and 40 which are distinctly blue.

The narrow beam of radiation directed downwardly through the opening 55 is excellent for checking the general appearance of the egg. For example, by moving an egg initially into this supplementary beam, it can be checked for dirt discolor and for shell shade. The latter will direct even an unskilled operator to a desirable setting of the lever 45. If the egg is moved into the angled or inclined beam produced by the filter 64, it can be viewed in radiation which, while primarily ultra-violet, also contains some red and green. This permits checking for the presence of oil emulsions often used to prevent evaporation from the shell. Such oil emulsion is excited to a bluish fluorescence by such a beam. This beam can also be used to check eggs washed with particular detergents which show up characteristically in this particular light. However, movement of the egg into the main beam gives an immediate and strong indication of the presence of pseudomonas bacteria either in incipient or more advanced stages. Viewed in this beam, the egg can be rapidly checked for internal defects of the types previously mentioned.

It is desirable that the auxiliary or supplemental beams from the opening 55 and 60 should extend in directions angularly disposed with respect to the direction of the main beam. It is preferred that the beams in the opening 55 be substantially perpendicular to the axis of the main beam and that it be directed generally downward so that it can illuminate the egg crate without interfering with the dark vision of the operator. Likewise, it is desirable that the beam from the opening 60 be directed downwardly and away from the main beam, permitting the egg to be moved therethrough as it advances to the main candling position. With the arrangement shown, it is desirable that the housing 10 be mounted near the front edge of a table or shelf 70, preferably in such way that the axis of the main beam can be adjusted with respect to the horizontal. This is made possible by use of a clamp member 71 secured to the rear section 12 with its rear portion providing a slot 72 cut as an arc about a bolt 73 acting to pivot the clamp member 71 with respect to a mounting flange 74 secured to the table or shelf 70. A bolt 75 is carried by the mounting flange and extends through the slot 72 so that by tightening a thumb nut 76 the housing 10 can be clamped in an adjusted position, preferably with the axis of the main beam directed slightly downward from the horizontal, as suggested in Fig. 2. We have found that if candling is carried out in a room where the environmental light is complementary to the blue light of the candler, there is less eye strain and better results. Complete darkness provides a high contrast to the light on the shell of the egg and if the room is illuminated with white light the glare still persists but if a yellow or orange light is used the glare is greatly reduced. The preferred practice is to use a yellowish light, e.g., an orange or yellow light, as the ambient light in the room, particularly if such light is applied to the lower level of the room.

Various changes can be made without departing from the spirit of the invention as defined in the appended claims.

We claim as our invention:

1. Egg candling apparatus including in combination: walls defining an egg-candling aperture; a source of ultra-violet light having intense ultra-violet, blue and green lines in its spectrum; a first filter positioned forward of said light source but back of said aperture; means for permanently blocking all radiation from said source to said aperture except that radiation passing through said first filter, said filter being of a material transmitting substantially exclusively the radiation of said ultra-violet source in the blue and ultra-violet wavelength range of about 3300 A. to about 4800 A. while largely absorbing the radiation of said source in the green region; a second filter of substantially the same transmission characteristics as said first filter; and means for mounting said second filter between said source and said first filter to turn in the path of the radiation from said source to said first filter from a position in which said second filter lies substantially parallel to said path to a position in which said second filter lies substantially transverse to said path.

2. Egg candling apparatus including in combination: a tubular housing comprising coaxial rear and front tubular sections and means for detachably connecting same with a rear portion of said front section telescoping with a front portion of said rear section, said front section converging to an opening; a source of ultra-violet radiation in said housing directing radiation toward said opening; a filter-mounting means provided by said front section immediately adjacent said opening; a filter in said mounting means at a position immediately back of said opening, said filter-mounting means providing portions beyond the periphery of said filter that are permanently opaque to all radiation from said source whereby said filter intercepts all of the radiation from said source reaching said opening; a candling collar forward of said opening, said collar providing an egg-candling aperture; and means detachably attaching said collar to said front section.

3. Egg candling apparatus as defined in claim 2 in which one of said sections includes an adjustable mounting bracket exterior thereof for mounting said tubular housing in an adjustable but generally horizontal position, said bracket including a flange connected to said one of said sections, a mounting flange, and means for adjustably connecting said first-named flange to pivot relative to said mounting flange.

4. Egg candling apparatus including in combination: a mercury vapor source of ultra-violet radiation; walls defining an egg-candling aperture of a cross-sectional size less than the eggs to be candled; means for confining said radiation from said source to produce an intense beam through said aperture; and a blue filter between said source and said aperture fixedly intercepting all of the radiation reaching said aperture, said filter being formed of a medium passing large amounts of radiation from said source in the wavelength range of about 3300 A. to about 4800 A. but absorbing most of the radiation of said source in the wavelength range of about 5200 A. to about 5800 A., thus passing radiation in the near ultra-violet region and large amounts of blue radiation to provide bright illumination sufficient for the grading even of dark-shell eggs while blocking radiation in the green region of the spectrum, said filter being formed of glass having a transmission characteristic substantially as illustrated in Fig. 7, said filter being of a thickness of about 2.5–3 mm.

5. Egg candling apparatus including in combination: a mercury vapor source of ultra-violet radiation; walls defining an egg-candling aperture of a cross-sectional size less than the eggs to be candled; means for confining said radiation from said source to produce an intense beam through said aperture; a blue filter between said source and said aperture fixedly intercepting all of the radiation reaching said aperture, said filter being formed of a medium passing large amounts of radiation from said source in the wavelength range from about 3300 A. to about 4800 A. but absorbing most of the radiation of said source in the wavelength range of about 5200 A. to about 5800 A., thus passing radiation in the near ultra-violet region and large amounts of blue radiation to provide bright illumination sufficient for the grading even of dark-shell eggs while blocking radiation in the green region of the spectrum; and means for effectively changing the intensity of the beam of radiation passing said aperture, said last-named means comprising a supplemental filter having substantially the same light transmission characteristics as said first-named filter and including means for mounting same to move in said beam.

6. Egg candling apparatus including in combination: a tubular housing providing a first forwardly-facing opening disposed along a forward axis, a second downwardly-facing opening directed at right angles away from said forward axis, and a third angled opening facing in a downwardly angled direction angularly between the directions of said first and second opening; a source of ultra-violet radiation in said tubular housing providing a main beam directed along said forward axis toward said first forwardly-facing opening, separate portions of the radiation from said source passing through said second and third openings to the exterior of said housing as spaced beams independent of each other and of said main beam; a blue filter of substantially the characteristics of Fig. 7 positioned to filter all of said radiation traversing said first opening; and a purplish filter positioned to intercept radiation from said source passing through said third opening.

7. Egg candling apparatus as defined in claim 6 including a third filter of slight blue color positioned to intercept radiation from said source passing through said second opening, said third filter modifying such radiation to simulate daylight.

References Cited in the file of this patent

UNITED STATES PATENTS

| | | |
|---|---|---|
| 2,267,834 | Mulvany | Dec. 30, 1941 |
| 2,686,267 | Vogel | Aug. 10, 1954 |
| 2,733,351 | Vogel | Jan. 31, 1956 |